United States Patent
Gargi et al.

(10) Patent No.: US 8,683,521 B1
(45) Date of Patent: Mar. 25, 2014

(54) FEATURE-BASED VIDEO SUGGESTIONS

(75) Inventors: Ullas Gargi, Los Altos, CA (US); Jay Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 721 days.

(21) Appl. No.: 12/415,923

(22) Filed: Mar. 31, 2009

(51) Int. Cl.
*G06F 13/00* (2006.01)

(52) U.S. Cl.
USPC .............................................. 725/44; 725/47

(58) Field of Classification Search
None
See application file for complete search history.

(56) References Cited

U.S. PATENT DOCUMENTS

| | | | |
|---|---|---|---|
| 7,072,846 B1 * | 7/2006 | Robinson | 705/7.32 |
| 7,853,071 B2 | 12/2010 | Friedhoff et al. | |
| 2002/0112239 A1 * | 8/2002 | Goldman | 725/46 |
| 2004/0025180 A1 | 2/2004 | Begeja et al. | |
| 2006/0161952 A1 * | 7/2006 | Herz et al. | 725/46 |
| 2007/0136753 A1 * | 6/2007 | Bovenschulte et al. | 725/46 |
| 2009/0172730 A1 | 7/2009 | Schiff et al. | |

OTHER PUBLICATIONS

Aggarwal, C., et al., "Horting Hatches an Egg: A New Graph-Theoretic Approach to Collaborative Filtering," In Proceedings of the Fifth ACM SIGKDD International Conference on Knowledge discovery and data mining, 1999, 12 Pages.

Baluja, S., et al., Video Suggestion and Discovery for YouTube: Taking Random Walks Through the View Graph, International World Wide Web Conference Committee (IW3C2) 2008, Apr. 21-25, 2008, Beijing, China, 10 Pages.

Herlocker, J., et al., "Explaining Collaborative Filtering Recommendations," CSCW'00, Dec. 2-6, 2000, 10 Pages.

Vallet, D., et al., "Use of Implicit Graph for Recommending Relevant Videos: A Simulated Evaluation," Lecture Notes in Computer Science, 2008, pp. 199-210.

\* cited by examiner

*Primary Examiner* — Cai Chen
(74) *Attorney, Agent, or Firm* — Fenwick & West LLP

(57) ABSTRACT

A suggestion server generates suggestions of videos. The suggestion server analyzes log data to create co-watch data identifying pairs of co-watched videos and containing generate values representing the number of times the pairs of videos were co-watched. The suggestion server uses the co-watch data to create feature vectors for the co-watched videos. The suggestion server uses the feature vectors to train a ranker for each video. When trained, the ranker can be applied to a feature vector for a video to produce a ranking score. To produce suggestions for a given video, a set of candidate videos is defined. The suggestion server applies the feature vectors for the candidates to the ranker for the given video to produce ranking scores. The candidate videos are ranked based on their ranking scores, and the highest-ranked candidates are provided as suggestions for the given video.

23 Claims, 6 Drawing Sheets

FEATURE-BASED VIDEO SUGGESTIONS

BACKGROUND

1. Field of the Invention

This invention generally relates to item suggestions and more specifically to generating suggestions for videos based on features of the videos.

2. Description of the Related Art

The sharing of video content on websites has developed into a worldwide phenomenon, supported by dozens of websites. On average, over 10,000 videos are posted every day, and this number is increasing as the tools and opportunities for capturing video become easier to use and more widespread. Millions of people watch the posted videos.

Operators of video sharing websites have a general desire to improve the experiences of the viewers of the shared videos. For example, the viewer experience can be improved by providing the viewer with suggestions for videos the viewer might find interesting. Such suggestions can be provided while a current video is playing and/or upon completion of a played video.

Currently, suggestions are generated based on a variety of techniques that seek to identify related videos. One such technique is to assume that videos watched by a user in response to a search query are related. If a user submits a query for videos matching specific criteria, the videos the user selects and watches from the search results can be treated as related. Similarly, videos watched by a user during a given time interval can be treated as related. Another technique for generating suggestions is examining metadata associated with the videos, such as tags specified by the videos' providers. Videos with similar metadata are treated as related. Another similar technique is to identify the vertical categories associated with the videos (e.g., "Sports|Soccer") and to treat videos within the same vertical category as related. Videos that are related to a watched video are provided as suggestions.

The techniques described above work well, but are not ideal. One problem that can occur is that videos watched together can become tightly clustered. Videos that are suggested together tend to become watched together, which can result in a feedback loop that causes a cluster of related videos to always be suggested together. It would be better to provide a broader set of suggested videos.

SUMMARY

The above and other needs are met by a method, computer-readable storage medium, and computer for suggesting videos to a viewer of a given video. Embodiments of the method comprise determining co-watchedness of videos served by a video server to produce co-watch data and creating feature vectors for the videos based at least in part on the co-watch data. A feature vector for a video describes other videos co-watched with the video. Embodiments of the method further comprise training a ranker for the given video based at least in part on the feature vectors, identifying a set of suggested videos for the given video using the ranker, and providing the set of suggested videos to the viewer.

Embodiments of the computer-readable storage medium contain executable computer code for suggesting videos to a viewer of a given video, the computer code comprising code for determining co-watchedness of videos served by a video server to produce co-watch data and for creating feature vectors for the videos based at least in part on the co-watch data. The computer code further comprises code for training a ranker for the given video based at least in part on the feature vectors, identifying a set of suggested videos for the given video using the ranker, and providing the set of suggested videos to the viewer.

Embodiments of the computer comprise a computer-readable storage medium containing executable computer code for suggesting videos to a viewer of a given video, the computer code comprising code for determining co-watchedness of videos served by a video server to produce co-watch data and for creating feature vectors for the videos based at least in part on the co-watch data. The computer code further comprises code for training a ranker for the given video based at least in part on the feature vectors, identifying a set of suggested videos for the given video using the ranker, and providing the set of suggested videos to the viewer. The computer further comprises a processor for executing the computer code.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
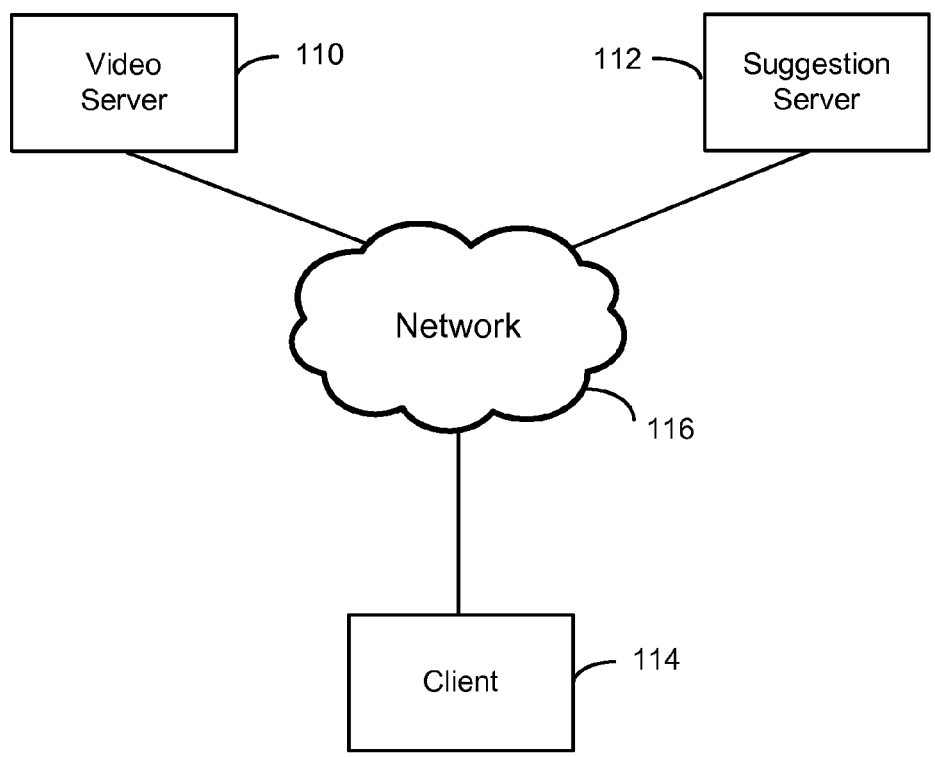
FIG. 1 is a high-level block diagram of a computing environment according to one embodiment.

FIG. 1 is a high-level block diagram of a computing environment 100 according to one embodiment. FIG. 1 illustrates a video server 110, a suggestion server 112, and a client 114 connected by a network 116. Only one client 114 is shown in FIG. 1 in order to simplify and clarify the description. Embodiments of the computing environment 100 can have thousands or millions of clients 114, as well as multiple video 110 and suggestion servers 112.

The video server 110 serves video content (referred to herein as "videos") to clients 114 via the network 116. In one embodiment, the video server 110 is located at a website provided by YOUTUBE, LLC of San Bruno, Calif., although the video server can also be provided by another entity. The video server 110 includes a database storing multiple videos and a web server for interacting with clients 114. The video server 110 receives requests from users of clients 114 for the videos in the database and serves the videos in response. In addition, the video server 110 can receive, store, and serve videos posted by users of the clients 114 and by other entities.

An embodiment of the video server 110 maintains one or more logs indicating which users viewed which videos, and when the videos were viewed. The video server 110 can collected the log data by using cookies to anonymously identify and track the activities of unique users (or clients 114). The log data thus allows one to determine what videos were watched by a user within a given time period, or "session." Any two videos that are watched by a user within the same session are said to be "co-watched." In one embodiment, a session is defined as a 24-hour period, but different embodiments can define sessions using different time periods.

The video server 110 also suggests videos to the users of the clients 114. The suggested videos include other videos in which the user might be interested. At least some of the suggestions are context-sensitive, meaning that the suggestions are based on the users' interactions with the video server 110. In one embodiment, the suggestions made to a user are based on one or more other videos viewed by the user. For example, after the user completes viewing of a video, the video server 110 can suggest one or more other videos related to that video. These suggestions can appear, for example, in the same display area in which the video appeared. The video server 110 can also provide a list of suggested videos in a separate display area that is displayed while the user watches a video.

The suggestion server 112 generates the suggestions that are provided by video server 110. An embodiment of the suggestion server 112 analyzes the log data collected by the video server 110 to identify pairs of co-watched videos and generate values representing the number of times the pairs of videos were co-watched. The suggestion server 112 uses this information to create feature vectors for the co-watched videos.

The suggestion server 112 uses the feature vectors to train a ranker for each co-watched video. A ranker is trained using positive and negative samples. The positive samples include the feature vectors of videos that were co-watched with the video for which the ranker is being trained. The negative samples can include, for example, feature vectors for random, non-co-watched videos. When trained, the ranker can be applied to a feature vector for a video to produce a ranking score.

To produce suggestions for a given video, a set of candidate videos is defined. The suggestion server 112 applies the feature vectors for the candidates to the ranker for the given video to produce ranking scores. The candidate videos are ranked based on their ranking scores, and the highest-ranked candidates are provided to the video server 110 as suggestions for the given video. Using the log data, feature vectors, and rankers in this manner allows for a broad set of candidate videos to be ranked and provided as suggestions.

The client 114 is a computer or other electronic device used by one or more users to perform activities including viewing videos received from the video server 110. The client 114, for example, can be a personal computer executing a web browser 118 that allows the user to browse and search for videos available at the video server web site. In other embodiments, the client 114 is a network-capable device other than a computer, such as a personal digital assistant (PDA), a mobile telephone, a pager, a television "set-top box," etc.

The network 116 enables communications among the entities connected to it. In one embodiment, the network 116 is the Internet and uses standard communications technologies and/or protocols. Thus, the network 116 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 116 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 116 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Figure 2:
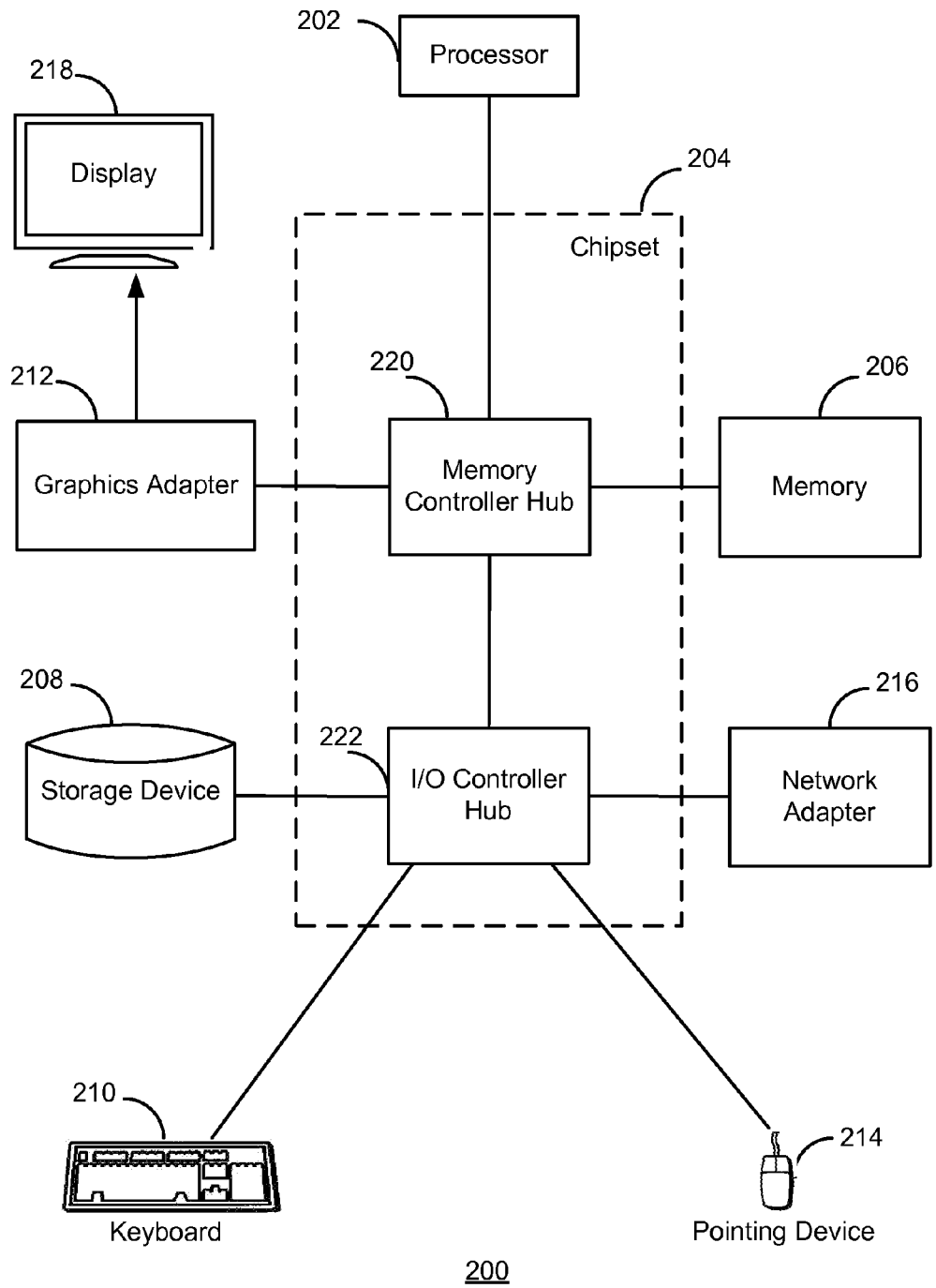
FIG. 2 is a high-level block diagram illustrating an example of a computer for use as a video server, suggestion server, and/or client.

FIG. 2 is a high-level block diagram illustrating an example of a computer 200 for use as a video server 110, suggestion server 112, and/or client 114. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 116. Some embodiments of the computer 200 have different and/or other components than those shown in FIG. 2.

The computer 200 is adapted to execute computer program modules for providing functionality described herein. As used herein, the term "module" refers to computer program code and other logic used to provide the specified functionality. Thus, a module can be implemented in hardware, firmware, and/or software. In one embodiment, program modules formed of executable computer program code are stored on the storage device 208, loaded into the memory 206, and executed by the processor 202.

The types of computers 200 used by the entities of FIG. 1 can vary depending upon the embodiment and the processing power used by the entity. For example, a client 114 that is a mobile telephone typically has limited processing power, a small display 218, and might lack a pointing device 214. The video server 110, in contrast, may comprise multiple blade servers working together to provide the functionality described herein.

Figure 3:
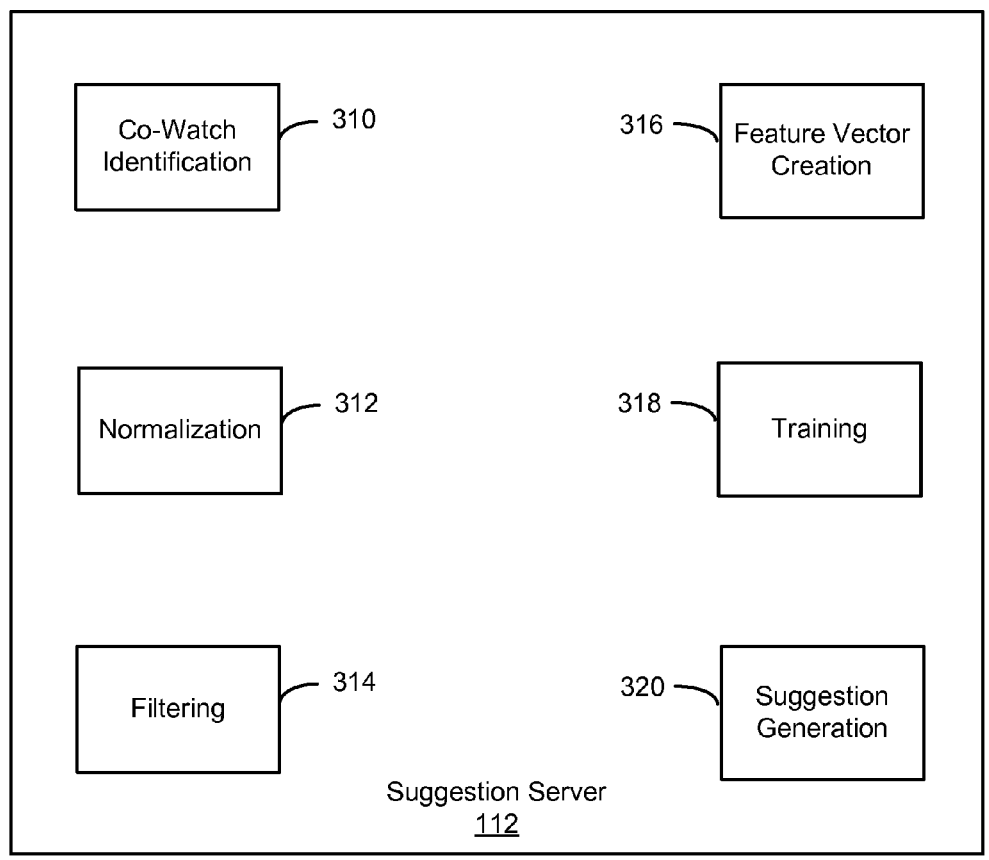
FIG. 3 is a high-level block diagram illustrating modules within the suggestion server according to one embodiment.

FIG. 3 is a high-level block diagram illustrating modules within the suggestion server 112 according to one embodiment. Some embodiments of the suggestion server 112 have different and/or additional modules than the ones described here. Similarly, the functions can be distributed among the modules in a different manner. Certain modules and functions can be incorporated into other modules of the suggestion server 112 and/or other entities on the network 116, including the video server 110 and client 114.

A co-watch identification module 310 (the "co-watch module") identifies videos served by the video server 110 that are co-watched. In one embodiment, the co-watch module 310 analyzes the log data collected by the video server 110 in order to identify the videos that were watched by the users during their sessions. A pair of videos watched by a given user within a given session are said to be "co-watched." For example, the co-watch module 310 can analyze the log data for a given time period, such as a day, week, or month, to identify the users and user sessions described therein. Then, the co-watch module 310 can identify all of the pairs of videos that were co-watched by individual users within the time period. The co-watch module 310 can also evaluate co-watchedness based on the amount of video watched by the user. For example, the co-watch module 310 can treat only videos where the user watched more than 75% of the total video (or some other threshold amount) as co-watched.

In one embodiment, the co-watch module 310 aggregates pairs of co-watched videos. In other words, for every pair of co-watched videos [v1, v2], the co-watch module 310 maintains a count of how many times the videos were co-watched across all users. The co-watch module 310 can represent the aggregate data as a matrix, with all of the videos identified in the log data listed along both the X and Y axes, and the intersection of two videos (e.g., [v1, v2]) holding a value, called the "co-watch data," indicating the number of times the pair of videos was co-watched across all users. The matrix is merely a convenient way to conceptually represent the co-watch data, and embodiments of the co-watch module 310 can represent the aggregate data in other ways.

A normalization module 312 normalizes the co-watch data to discount the influence of popular videos. The most popular videos at any given point in time are watched by many users within their sessions. For example, many people will watch the latest music video for a popular musician within their sessions. As a result, these popular videos become co-watched with a wide variety of videos with which the popular videos are not intrinsically related. The normalization prevents these popular videos from skewing the suggestions.

In one embodiment, the normalization module 312 performs the normalization using a term frequency-inverse document frequency (TF-IDF)-based technique applied in the video domain. The TF-IDF technique is applied to each pair of co-watched videos to transform the value indicating the number of times the pair was co-watched into a value that down-weights popular videos. In one embodiment, the TF-IDF technique is performed as follows:

$$NV_{i,j} = \frac{\text{Num}(v_i, v_j)}{\text{Num}(v_i)} \times \log \frac{V}{\sum_k (v_k, v_j)}$$

Here, $NV_{i,j}$ is the normalized value (i.e., the normalized co-watch data) for the pair of co-watched videos ($v_i$, $v_j$). $\text{Num}(v_i, v_j)$ is the number of times the pair of videos was co-watched, and $\text{Num}(v_i)$ is the number of times Video $v_i$ was watched overall. V is the total number of unique videos identified in the log data, and $$\sum_k (v_k, v_j)$$

is the number of times video $v_j$ was co-watched with all videos. The normalized co-watch data are stored in the matrix in place of the value indicating the non-normalized co-watch data.

A filtering module 314 uses the normalized co-watch data to identify the videos most frequently co-watched with a given video. In one embodiment, for each video, the filtering module 314 selects the N-highest normalized co-watch values for that video in the matrix. Said another way, the filtering module 314 filters out all but the N-highest normalized co-watch values for each video. "N" in one embodiment is 1,000. Different embodiments can use different values of N. Moreover, the filtering module 314 is absent in some embodiments.

One way to understand the operation of the filtering module 314 is to visualize the matrix. If the log data identify 200 million co-watched videos, then the matrix has dimensions of 200 million by 200 million. The filtering module 314 analyzes a row (or column) of the matrix to identify the N (e.g., 1000) highest co-watch values and removes the other co-watch values from the row. Thus, the end result is a sparse 200 million by 200 million matrix, where each row or column has no more than N values.

A feature vector creation module 316 (the "FV creation module") creates feature vectors describing the co-watchedness of the videos served by the video server 110. In one embodiment, the FV creation module 316 creates a feature vector for each co-watched video. Thus, if there are 200 million co-watched videos, the FV creation module 316 creates 200 million feature vectors.

A feature vector for a given video includes a list of the videos that were co-watched with the given video, and the associated normalized co-watch values. For example, the feature vector for a video $v_i$ is ($[v_{i0}, c_{i0}], [v_{i1}, c_{i1}], \ldots$), where $v_{in}$ is the normalized co-watch value and $c_{in}$ is an identifier of the other video in the pair with which the co-watch value is associated. Assuming the filtering module 314 has been used, then each feature vector will have no more than 1,000 features.

A training module 318 uses the feature vectors to create and train classifiers for the videos. The training module 318 trains a classifier for each video. In one embodiment, the training module 318 trains a form of classifier called a "ranker" using both positive and negative samples. The training module 318 performs machine learning using the positive and negative samples and produces a model (the ranker) that has weights assigned to the various features. The ranker for a first video, when applied to a feature vector of a second video, produces a score that can be used to rank the relatedness (i.e., the co-watchedness) of the second video to the first video.

The positive samples in one embodiment include the feature vectors for the first order co-watched videos of the video for which the ranker is being trained. The negative samples in one embodiment include the feature vectors for videos that are in opposition to the positive samples. That is, for a ranker for a given video, the training module 318 trains using the feature vectors of the 1,000 videos that were co-watched with the given video (as identified by the filtering module 314) as positive samples. The negative samples, in turn, can include feature vectors for videos that are known or suspected to be not related to the video for which the ranker is being trained, e.g., feature vectors for random videos (filtered to exclude first order co-watched videos) and feature vectors of second order co-watched videos (i.e., the co-watched videos of the videos that were co-watched with the given video), etc. Depending upon the embodiment, the training module 318 can train on other and/or additional positive and negative samples than the ones described herein.

In one embodiment, the training module 318 applies one or more constraints to guide the training process. The training module 318 can apply a neighbor-consistency constraint to guide the training toward learning a model that is consistent with that of its neighbors. This constraint can be applied by providing positive samples for neighbors during the training process and penalizing a model that generates very negative scores for the samples. The training module 318 can also apply a neighbor-diversity constraint to guide the training toward learning a model where suggestions for neighboring videos are sufficiently diverse. Neighbor-diversity can be achieved by using the positive samples of neighbors as negative samples while training the model.

A suggestion generation module 320 (the "suggestion module") suggests videos. In one embodiment, the suggestion module 320 provides suggestions for one or more given videos. In order to provide the suggestions for a given video, the suggestion module 320 identifies a set of suggestion candidate videos, and applies the ranker for the given video to the feature vectors for the candidates videos in the set to produce a set of ranking scores. The suggestion module 320 ranks the candidate videos by the videos' associated ranking scores, and presents the highest-scoring videos as a set of suggestions. The number of videos within the suggestion set can vary depending upon the embodiment. If there are multiple given videos for which suggestions are being provided, the suggestion module 320 can merge the suggestion sets for the two videos by, for example, providing the intersection or union of the sets or using another technique. The suggestion generation module 320 can generate the suggestions in real-time, as videos are identified as needing suggestions, or can generate suggestions in an advance as part of an offline process.

The suggestion module 320 can use a variety of techniques to identify the set of suggestion candidate videos. In one embodiment, the set of suggestion candidates includes other videos in the same co-watch "neighborhood" as the video for which suggestions are being provided. Generally, the "neighborhood" includes videos within a specified order of co-watchedness as the video for which the suggestions are being provided. For example, the set can include first and second order co-watched videos. The neighborhood can also include videos having metadata similar to the metadata of the video for which the suggestions are being provided. Other embodiments can include additional and/or different videos in the set of suggestion candidates.

Figure 4:
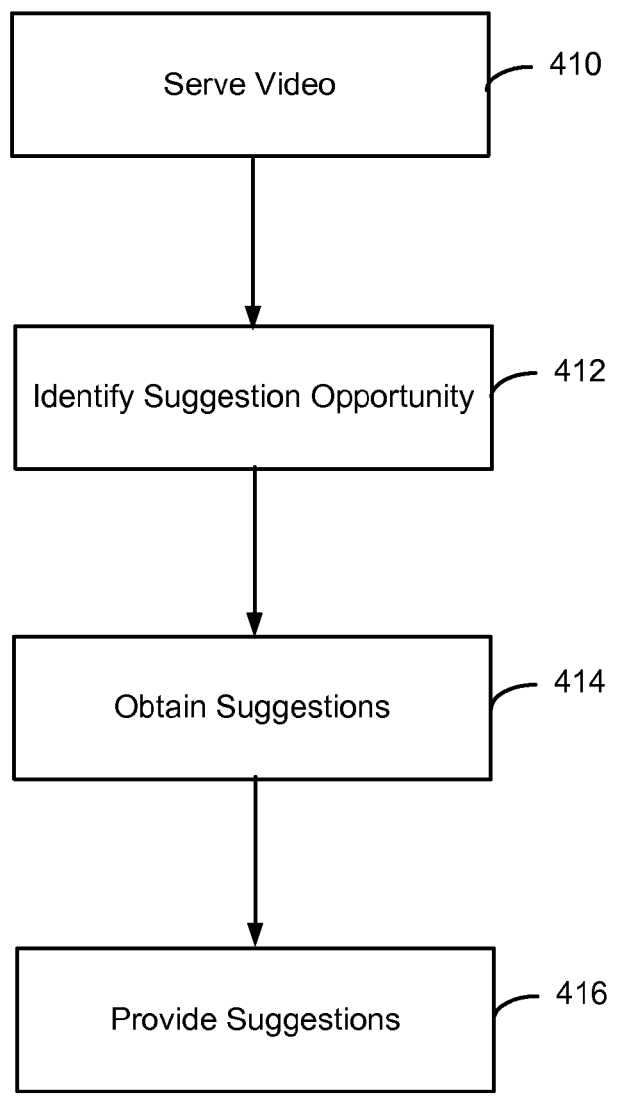
FIG. 4 illustrates the operation of the video server to provide suggestions according to one embodiment.

FIG. 4 illustrates the operation of the video server 110 to provide suggestions according to one embodiment. Other embodiments can perform additional and/or different steps, and perform the steps in different orders. Initially, the video server 110 serves 410 a video to a client 114. The video server 110 identifies 412 an opportunity to provide a suggestion to the client 114. The opportunity can occur, for example, while populating a list of suggested videos that is displayed contemporaneously with playback of the initial video Likewise, the opportunity can occur when the initial video completes its playback and a suggested video can be displayed in the same region in which the initial video played.

The video server 110 obtains 414 one or more suggested videos based on the initial video. The video server 110 can obtain the suggested videos by providing an identifier of the initial video to the suggestion server 112 along with other parameters, such as a number of suggestions required. The video server 110 then receives identifiers of the suggested videos from the suggestion server 112. The video server 110 provides 416 the suggestions to the client 114 by, for example, causing thumbnail images of the suggested videos to display at the client.

In a variation of the scenario described in FIG. 4, the suggestions can be based on multiple videos. For example, the suggestions can be based on multiple videos watched by the user within the user's current session, or on videos recently watched by the user. In this scenario, the user need not watch an initial video in order to receive the suggestions; the video server 110 can identify the user, determine a set of videos previously viewed by the user, and provide suggestions based on the set of previously-viewed videos.

Figure 5:
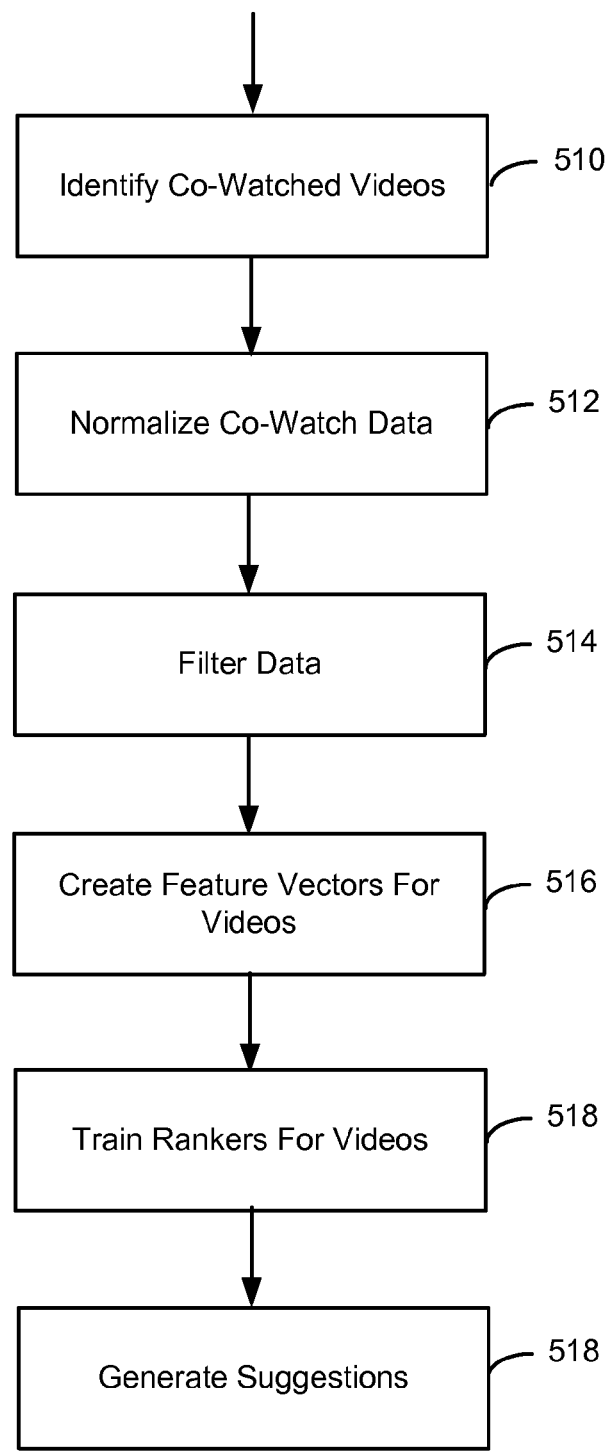
FIG. 5 illustrates the operation of the suggestion server to provide suggestions according to one embodiment.

FIG. 5 illustrates the operation of the suggestion server 112 to provide suggestions according to one embodiment. Other embodiments can perform additional and/or different steps, and perform the steps in different orders. Likewise, the steps can be performed at different times.

The suggestion server 112 identifies 510 co-watched videos. This identification can be performed by analyzing log data to identify videos that were co-watched within user sessions. The suggestion server 112 normalizes 512 the co-watch data to discount the influence of popular videos. The suggestion server 112 then filters 514 the normalized data by identifying, for each video, the videos most frequently co-watched with the video. The suggestion server 112 creates 516 feature vectors for the videos. The feature vector for a video describes the co-watchedness of the video.

Next, the suggestion server 112 uses the feature vectors to train 518 rankers for the videos. A ranker for a video is trained 518 using positive and negative samples. Positive samples can include the feature vectors of videos that were co-watched with the video while negative samples can include feature vectors for videos in opposition to the positive samples, such as random, non-co-watched videos. The training might also incorporate one or more constraints, such as neighbor-consistency and/or neighbor-diversity constraints. To generate 520 suggestions, the suggestion server 112 defines a set of candidate videos and applies the feature vectors for the candidates to the ranker for the one or more videos for which suggestions are being provided. The suggestion server 112 ranks the candidates based on their ranking scores, and provides the highest-ranking videos as suggestions. If suggestions are being provided for multiple videos, the suggestion server 112 can generate a separate result set for each video, and then merge the result set to produce the suggestions.

Figure 6:
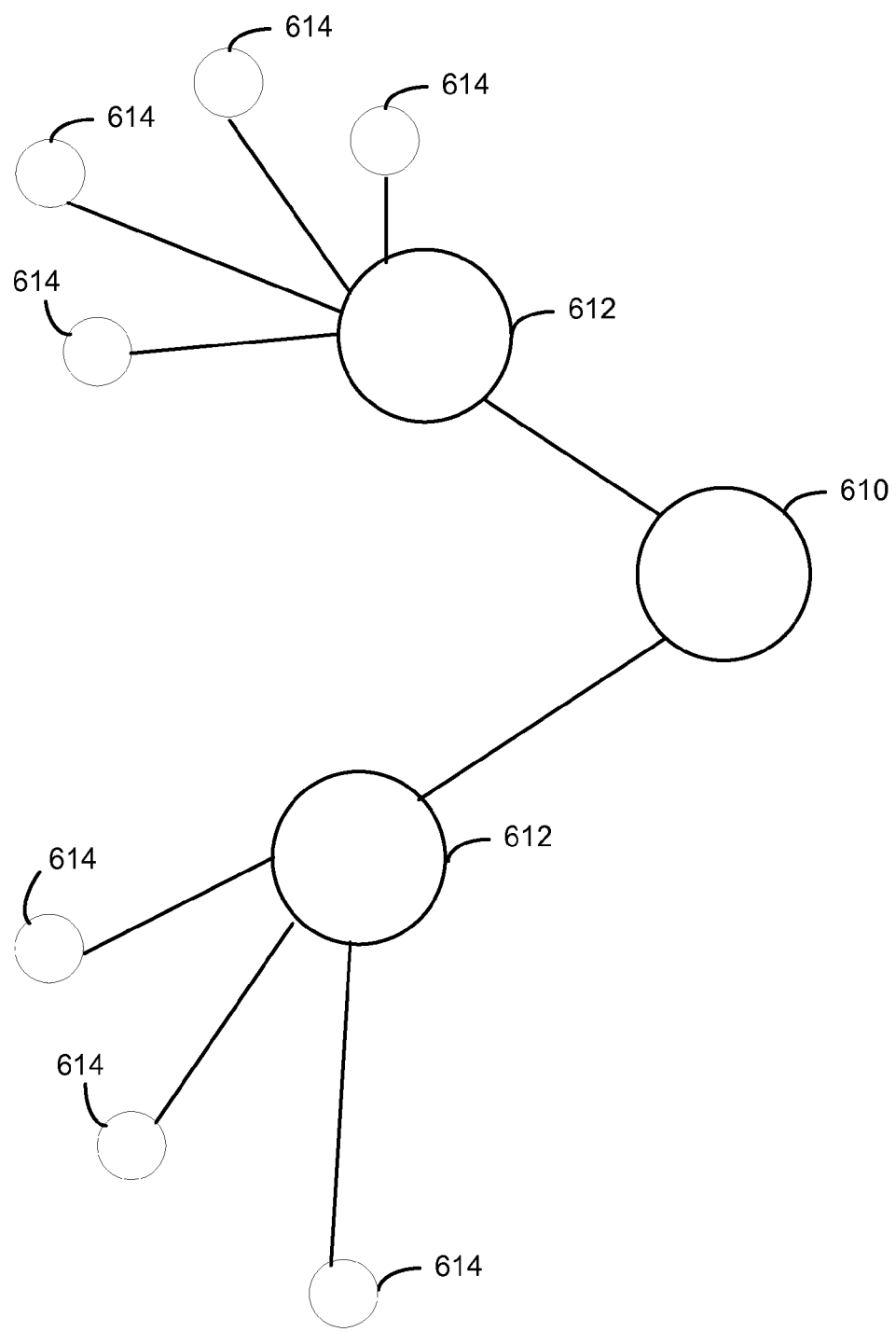
FIG. 6 illustrates a graph representing co-watchedness of videos.

FIG. 6 illustrates a graph 600 representing co-watchedness of videos. At the center of the graph 600 is a node 610 representing a video served by the video server 110. The graph 600 also contains two additional nodes 612 that are each directly connected to the first node 610 via an edge. These additional nodes 612 represent videos that were co-watched with the first node 610 and are said to be first order co-watched with the first node 610. Each of the additional nodes 612 has further nodes 614 connected to it. These latter nodes 614 were co-watched with the additional nodes 612 but not co-watched with the first node 610. Thus, the further nodes 614 are said to be second order co-watched with the first node 610. Given that the video server 110 can serve more than 200 million videos, the overall co-watchedness graph can be much larger than the small segment illustrated in FIG. 6.

The relationships shown by the graph 600 are useful for understanding how the positive and negative features are selected for training a ranker. In one embodiment, the feature vectors for the videos of the first order nodes 612 are used as positive features when training the ranker for the video of the first node 610, while the feature vectors for the videos of the second order nodes 614 can be used as negative features. In addition, the graph 600 is also useful for understanding the co-watch "neighborhood" for a video. The graph 600 is centered on the first node 610, and the other nodes are in the same neighborhood as the first node because they are near that node in the graph.

While this description focuses primarily on video content, the techniques described herein can also be applied to other items or types of content. For example, the techniques can be used to generate suggestions for audio content and still images.

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for suggesting videos to a viewer of a given video, comprising:
   using a computer comprising a processor and a memory for:
   creating feature vectors for videos served by a video server, a feature vector for a video describing other videos co-watched with the video;
   training a ranker for the given video based at least in part on the feature vectors, the trained ranker adapted to produce a ranking score for a candidate suggestion video based on a feature vector of the candidate suggestion video;
   identifying a plurality of candidate suggestion videos from the videos served by the video server;
   applying the ranker for the given video to feature vectors of the plurality of candidate suggestion videos to produce ranking scores for the plurality of candidate suggestion videos based at least in part on the feature vectors of the plurality of candidate suggestion videos;
   identifying a set of suggested videos for the given video from the plurality of candidate suggestion videos responsive to the ranking scores; and
   providing the set of suggested videos to the viewer.

2. The method of claim 1, wherein creating feature vectors comprises:
   analyzing log data collected by the video server to identify pairs of videos watched by a same viewer during a same viewer session.

3. The method of claim 1, wherein a feature vector created for a video comprises:
   a list of videos that were co-watched with the video; and
   co-watch values describing a co-watchedness of the videos in the list with the video.

4. The method of claim 1, further comprising:
   identifying videos most frequently co-watched with each video, wherein the feature vectors are based at least in part on the identified videos.

5. The method of claim 3, wherein:
   co-watch values describing co-watchedness of popular videos in the list with the video are normalized to discount influence of the popular videos.

6. The method of claim 1, wherein training a ranker for the given video comprises:
   training the ranker using positive samples, the positive samples comprising feature vectors for videos that were co-watched with the given video.

7. The method of claim 6, wherein training a ranker for the given video further comprises:
   training the ranker using negative samples, the negative samples comprising feature vectors for videos in opposition to other videos used as positive samples.

8. The method of claim 1, wherein identifying a set of suggested videos for the given video comprises:
   ranking the candidate suggestion videos in an order based at least in part on the ranking scores; and
   selecting the set of suggested videos based at least in part on the order.

9. The method of claim 1, wherein identifying a plurality of candidate suggestion videos comprises:
   identifying videos within a co-watch neighborhood of the given video as the candidate suggestion videos.

10. The method of claim 1, wherein a ranker is trained for each video identified as co-watched by a feature vector of the given video.

11. A non-transitory computer-readable storage medium containing executable computer code for suggesting videos to a viewer of a given video, the computer code comprising code for:
    using a computer comprising a processor and a memory for:
    creating feature vectors for videos served by a video server, a feature vector for a video describing other videos co-watched with the video;
    training a ranker for the given video based at least in part on the feature vectors, the trained ranker adapted to produce a ranking score for a candidate suggestion video based on a feature vector of the candidate suggestion video;
    identifying a plurality of candidate suggestion videos from the videos served by the video server;
    applying the ranker for the given video to feature vectors of the plurality of candidate suggestion videos to produce ranking scores for the plurality of candidate suggestion videos based at least in part on the feature vectors of the plurality of candidate suggestion videos;
    identifying a set of suggested videos for the given video from the plurality of candidate suggestion videos responsive to the ranking scores; and
    providing the set of suggested videos to the viewer.

12. The computer-readable storage medium of claim 11 wherein creating feature vectors comprises:
    analyzing log data collected by the video server to identify pairs of videos watched by a same viewer during a same viewer session.

13. The computer-readable storage medium of claim 11, wherein training a ranker for the given video comprises:
    training the ranker using positive samples, the positive samples comprising feature vectors for videos that were co-watched with the given video.

14. The computer-readable storage medium of claim 13, wherein training a ranker for the given video further comprises:
    training the ranker using negative samples, the negative samples comprising feature vectors for videos in opposition to other videos used as positive samples.

15. The computer-readable storage medium of claim 11, wherein identifying a set of suggested videos for the given video comprises:
    ranking the candidate suggestion videos in an order based at least in part on the ranking scores; and
    selecting the set of suggested videos based at least in part on the order.

16. The computer-readable storage medium of claim 11, wherein identifying a plurality of candidate suggestion videos comprises:
    identifying videos within a co-watch neighborhood of the given video as the candidate suggestion videos.

17. A computer for suggesting videos to a viewer of a given video, the computer comprising:
    a non-transitory computer-readable storage medium containing executable computer code, the computer code comprising code for:
    creating feature vectors for videos served by a video server, a feature vector for a video describing other videos co-watched with the video;

training a ranker for the given video based at least in part on the feature vectors, the trained ranker adapted to produce a ranking score for a candidate suggestion video based on a feature vector of the candidate suggestion video;

identifying a plurality of candidate suggestion videos from the videos served by the video server;

applying the ranker for the given video to feature vectors of the plurality of candidate suggestion videos to produce ranking scores for the plurality of candidate suggestion videos based at least in part on the feature vectors of the plurality of candidate suggestion videos;

identifying a set of suggested videos for the given video from the plurality of candidate suggestion videos responsive to the ranking scores; and providing the set of suggested videos to the viewer; and a processor for executing the computer code.

18. The computer of claim 17, wherein creating feature vectors comprises:

analyzing log data collected by the video server to identify pairs of videos watched by a same viewer during a same viewer session.

19. The computer claim 17, wherein training a ranker for the given video comprises:

training the ranker using positive samples, the positive samples comprising feature vectors for videos that were co-watched with the given video.

20. The computer of claim 19, wherein training a ranker for the given video further comprises:

training the ranker using negative samples, the negative samples comprising feature vectors for videos in opposition to other videos used as positive samples.

21. The computer of claim 17, wherein identifying a set of suggested videos for the given video comprises:

ranking the candidate suggestion videos in an order based at least in part on the ranking scores; and selecting the set of suggested videos based at least in part on the order.

22. The computer of claim 17, wherein identifying candidate suggestion videos comprises:

identifying videos within a co-watch neighborhood of the given video as the candidate suggestion videos.

23. The computer of claim 17, wherein training a ranker for the given video comprises:

guiding the training based at least in part on one or more constraints selected from the set consisting of:

a neighbor-consistency constraint that guides the training toward learning a ranker that is consistent with rankers of videos within a co-watch neighborhood of the given video; and a neighbor-diversity constraint that guides the training toward learning a ranker that produces suggestions diverse from rankers of videos within the co-watch neighborhood of the given video.

* * * * *